United States Patent

Fukura et al.

[11] Patent Number: 5,577,416
[45] Date of Patent: Nov. 26, 1996

[54] SLIDING CABLE AND ITS MANUFACTURING METHOD

[75] Inventors: Kenichi Fukura; Hiroki Kondoh; Katsumi Suzuki; Takayoshi Ito; Yasuyuki Kozawa; Kenji Hori, all of Aichi Pref., Japan

[73] Assignee: Aisin Seiki Kabushiki Kaisha, Kariya, Japan

[21] Appl. No.: 588,095

[22] Filed: Jan. 18, 1996

Related U.S. Application Data

[63] Continuation of Ser. No. 200,682, Feb. 23, 1994, abandoned.

[30] Foreign Application Priority Data

Feb. 26, 1993 [JP] Japan ............................ 5-038916
Apr. 27, 1993 [JP] Japan ............................ 5-101444

[51] Int. Cl.[6] ........................................ F16C 1/20
[52] U.S. Cl. ............................ 74/502.5; 74/501.5 R; 74/505; 49/352
[58] Field of Search ................ 74/502.5, 501.5 R, 74/502.3, 502.4, 502.6, 505; 49/360, 280, 352

[56] References Cited

U.S. PATENT DOCUMENTS

| 4,292,859 | 10/1981 | Teraura | 74/501.5 R |
| 4,378,712 | 4/1983 | Yoshifuji | 74/502.5 |
| 4,402,160 | 9/1983 | Brusasco | 74/502.5 |
| 4,411,168 | 10/1983 | Yoshifuji | 74/502.5 |
| 4,597,305 | 7/1986 | Brusasco | 74/502.5 X |
| 5,189,839 | 3/1993 | DeLand et al. | 49/360 |
| 5,235,866 | 8/1993 | Truman et al. | 74/501.5 R X |
| 5,239,890 | 8/1993 | Sonoski et al. | 74/501.5 R |

FOREIGN PATENT DOCUMENTS

| 861210 | 1/1971 | Canada | 74/502.5 |
| 3104819 | 8/1982 | Germany | 74/502.5 |
| 55-135247 | 10/1980 | Japan | 74/502.5 |
| 58-29324 | 6/1983 | Japan | 74/502.5 |

*Primary Examiner*—Vinh T. Luong
*Attorney, Agent, or Firm*—Oblon, Spivak, McClelland, Maier, & Neustadt, P.C.

[57] ABSTRACT

A sliding cable includes a core member, a tooth member wound around the core member and a covering member which is formed by extrusion molding of a foaming material and which covers the core member so as to project out from an outer circumferential surface of the tooth member.

1 Claim, 4 Drawing Sheets

SLIDING CABLE AND ITS MANUFACTURING METHOD

This application is a continuation of application Ser. No. 08/200,682, filed on Feb. 23, 1994, now abandoned.

BACKGROUND OF THE INVENTION

1. Field of the invention

This invention relates to a sliding cable mainly used for a remotely sliding a sun roof of a vehicle and its method for manufacturing.

2. Description of the Related Art

A conventional sliding cable is disclosed in the Japanese Utility Model No. 58(1983)-29324. The sliding cable disclosed in the prior art comprises a core member, a covering member covering the core member and a tooth member tightly wound around an outer circumferential portion of the covering member. The covering member projects out from an outer circumferential surface of the tooth member in order that the sliding cable is formed with an engaging portion which can engage with a gear portion of a gear member which drives the sliding cable, so that the sliding cable can be smoothly slid along a guide member which guides the sliding cable without noise being generated by the contact of the sliding cable with the guide member.

However in the prior art, because the covering member is disposed between the core member and the tooth member, the tooth member can be slid relative to the core member due to deformation of the covering member. Therefore, the due to deformation of the covering member. Therefore, the sliding cable may not efficiently transmit the sliding power to sun roof.

Another conventional sliding cable is disclosed in the U.S. Pat. No. 4,378,712. The sliding cable disclosed in this prior art comprises a core member, a tooth member tightly wound around an outer circumferential portion of the core member and a covering member formed of a foaming material and formed along the tooth member. The covering member projects out from an outer circumferential surface of the tooth member so as to form a tooth portion with the tooth member. Urethane mixed with water is applied along a tooth portion of the tooth member so as to cover the core member. The urethane reacts with the water and changes into the foaming material so as to project out from the outer circumferential surface of the tooth member. Therefore the sliding cable may be engaged with the gear portion of the gear member through the tooth portion and slid by the gear member so as to prevent noise from being generated by the contact of the sliding cable with the guide member. Further, since the covering member is not disposed between the core member and the tooth member, the tooth member cannot be slid relative to the core member.

However, because manufacture of the covering member of the sliding cable disclosed in this prior art requires the two processes of applying the urethane mixed with water to the core member and reacting the urethane with the water, the sliding cable is inconvenient to manufacture.

A further conventional sliding cable is disclosed in the Japanese Utility Model Laid Open No. 4(1992)-31358. The sliding cable disclosed in this prior art comprises a core member, a tooth member wound around an outer circumferential portion of the core member, a covering member covering the core member and the tooth member and a groove in the covering member and exposing the tooth member. The sliding cable receives the sliding power from the gear member through the exposed portion of the tooth member which prevents noise being generated by the contact of the sliding cable with the guide member.

However, because the sliding cable disclosed in this prior art requires formation of the groove in the covering member, the sliding cable is inconvenient to be manufactured.

SUMMARY OF THE PRESENT INVENTION

It is an object of the present invention to provide an improved sliding cable which can efficiently transmit sliding power.

It is another object of the present invention to provide an improved sliding cable which is convenient to manufacture.

It is a further object of the present invention to provide an improved sliding cable which can completely prevent noise generation when the sliding cable is slid.

It is a further object of the present invention to provide an improved sliding cable which is durable.

It is a further object of the present invention to provide an improved sliding cable which is simple in construction and small in size.

It is a further object of the present invention to provide an improved sliding cable which is low in cost.

It is a further object of the present invention to provide an improved manufacturing method for manufacturing a sliding cable which can efficiently transmit sliding power.

It is a further object of the present invention to provide an improved manufacturing method for easily manufacturing a sliding cable.

To achieve the above mentioned objects, a sliding cable in accordance with this invention comprises a core member, a tooth member wound around the core member and a covering member which is formed by extrusion molding of a foaming material and which covers the core member so as to project out from an outer circumferential surface of the tooth member.

BRIEF DESCRIPTION OF THE DRAWINGS

The features and advantages of the sliding cable according to the present invention will be more clearly appreciated from the following description in conjunction with the accompanying drawings wherein.

DETAILED DESCRIPTION OF PREFERRED EMBODIMENTS

Figure 1:
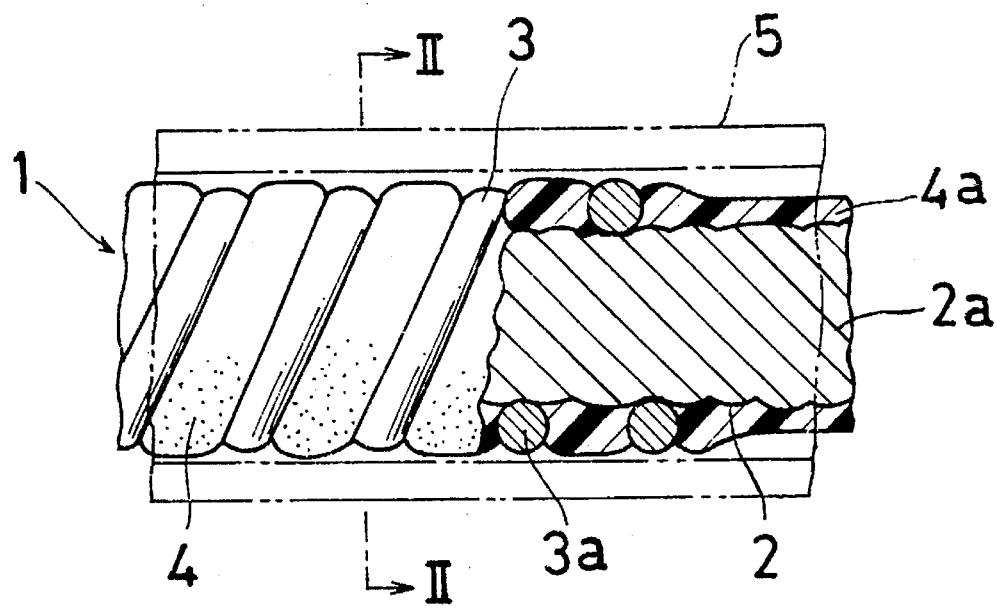
FIG. 1 is a sectional view of a sliding cable of a first embodiment of the present invention.
Figure 2:
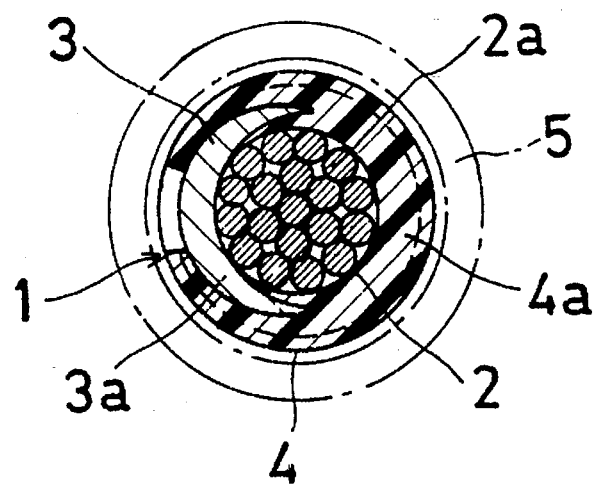
FIG. 2 is a sectional view of a sliding cable of the present invention taken on line II—II of FIG. 1.

Referring to FIG. 1, a first embodiment of a sliding cable 1 to be used for sliding a sun roof of a vehicle, comprises a core member 2, a tooth member 3 and a covering member 4. The core member 2 is formed of a wire having a plurality of fine wires 2a bindingly twisted together. The tooth member 3 is formed of a wire 3a wound around the core member 2. The covering member 4 is formed of a foaming material 4a (which includes a base material formed of an urethane resin or a polyester resin which generates a gas when heated). The covering member 4 is disposed along the tooth member 3 and projects out from an outer circumferential surface of the tooth member 3.

Figure 3:
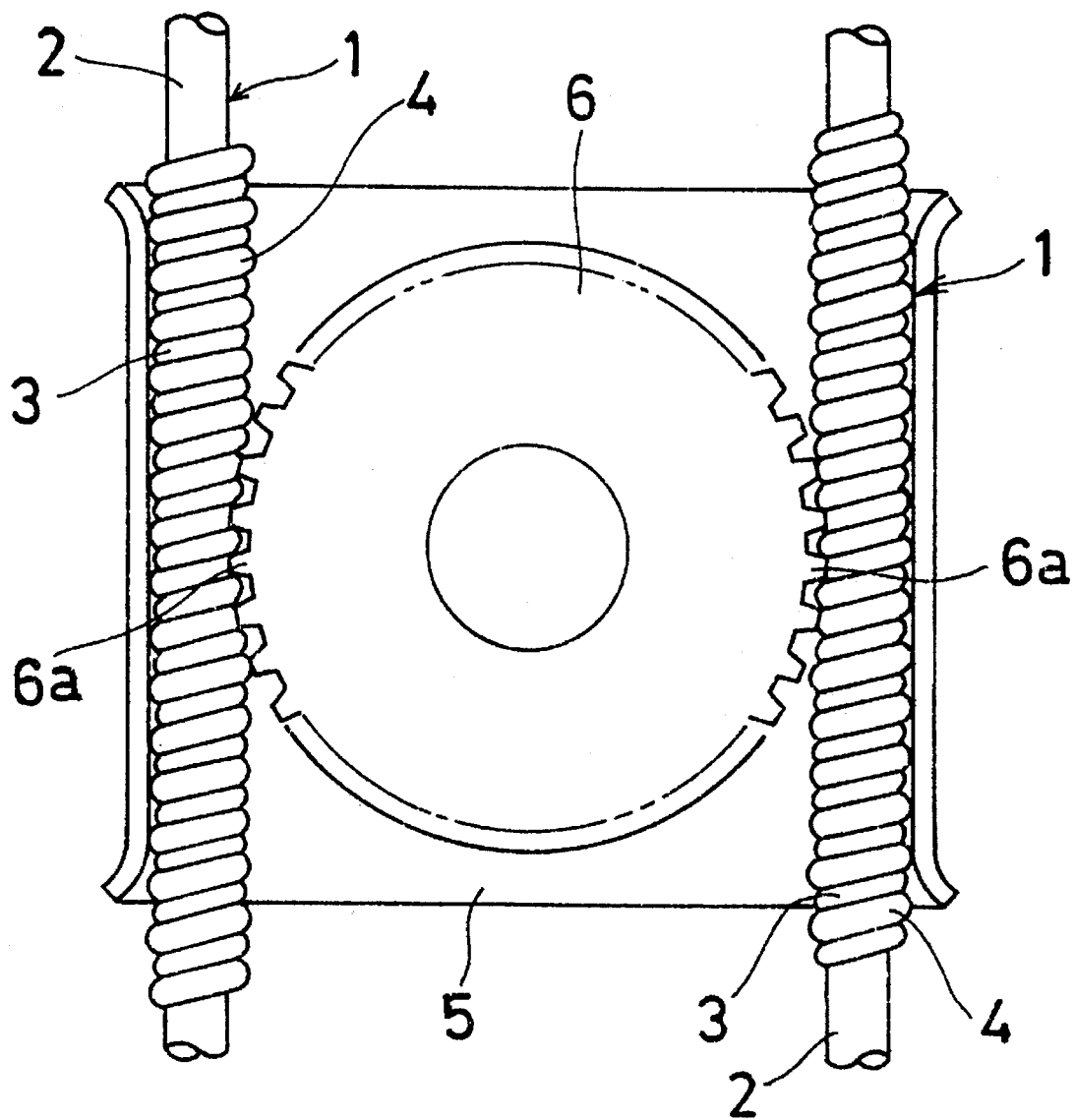
FIG. 3 is a plan view of a sliding cable of the present invention which is disposed between a gear member and a guide member.

The sliding cable 1 is slidably retained by a guide member 5. The tooth member 3 of the sliding cable 1 may be engaged with a gear portion 6a of a gear member 6 so as to be able to receive sliding power from the gear member 6 shown in FIG. 3. The gear member 6 is connected with an electric motor (not shown in the figures) through a reduction mechanism (not shown in the figures). The sliding cable 1 is connected with a movable panel which opens and closes a window formed on a roof panel of the vehicle (not shown in the figures) through a link mechanism (not shown in the figures).

When the gear member 6 is rotated, the sliding cable 1 is slid and guided by the guide member 5 due to engagement of the tooth member 3 with the gear portion 6a. At this time the sliding cable 1 is contacted with the guide member 5 through the covering member 4. Therefore the contact of the sliding cable 1 with the guide member 5 does not generate noise. Further, because the tooth member 3 is tightly wound around the core member 2, the tooth member 3 cannot be slid relative to the core member 2. The gear member 6 thus can efficiently transmit the sliding power to the sliding cable 1 since the transmission of the sliding power is not absorbed in the engagement of the tooth member 3 with the gear portion 6a.

Figure 4:
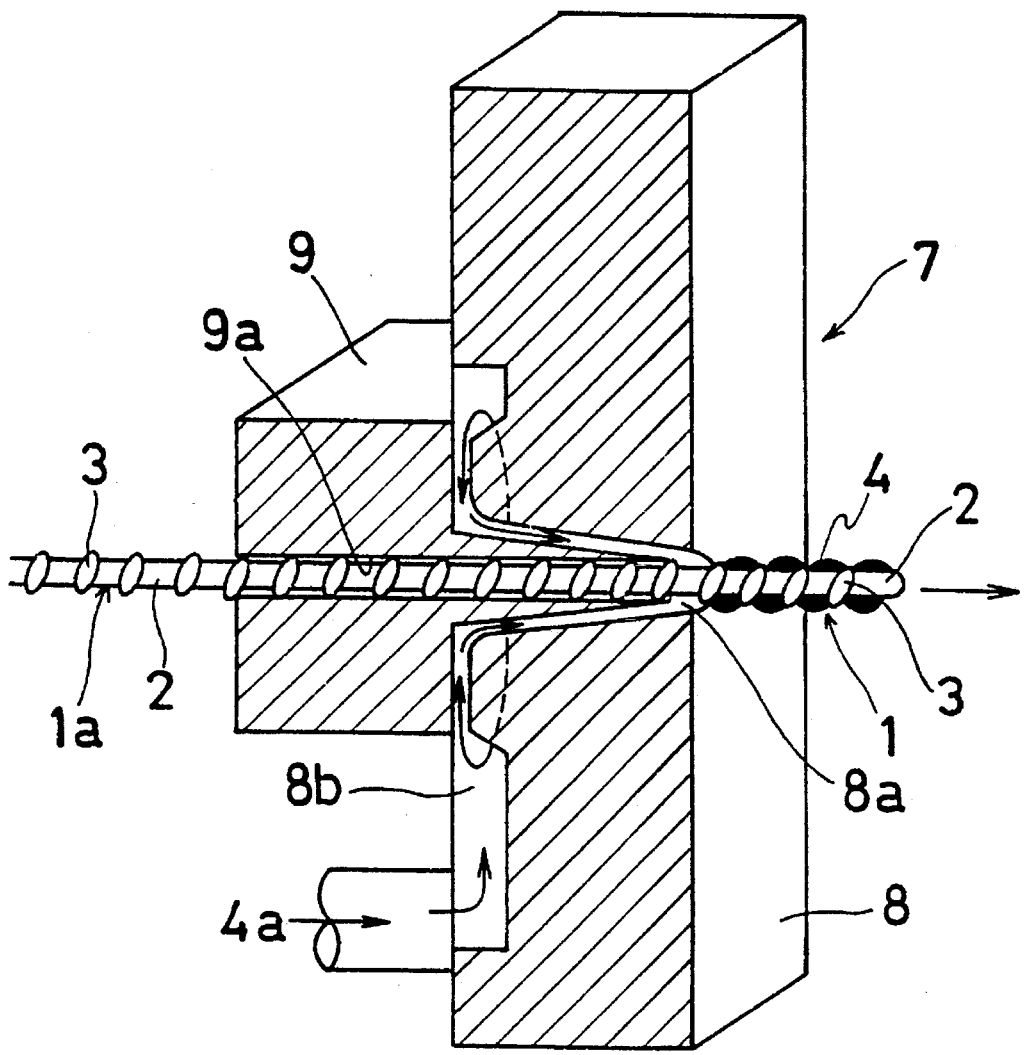
FIG. 4 is a perspective partly sectional view of an extrusion molding machine which forms a covering member of the present invention.

In FIG. 4 an extrusion molding machine 7 comprises an extrusion die 8 and a guide 9. The guide 9 includes a guide opening 9a into which an intermediate product 1a having the core member 2 and the tooth member 3 wound around the core member 2 is inserted. The extrusion die 8 includes a cavity 8a and a passage 8b which is connected with the cavity 8a. The guide 9 is adapted to the extrusion die 8 so as to connect the guide opening 9a with the cavity 8a.

Figure 5A:
FIG. 5 is a plan view of a core member of the sliding cable of the present invention which is not assembled into the sliding cable.
Figure 5B:
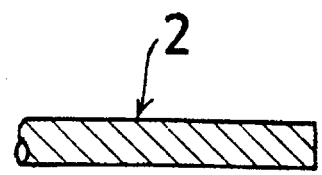
Figure 6A:
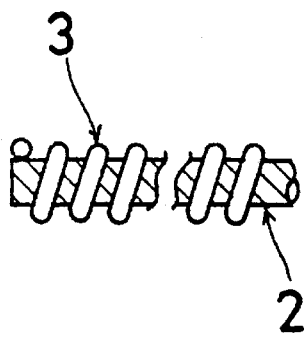
FIG. 6 is a plan view of a sliding cable of the present invention which is subjected to a first process of manufacturing the sliding cable.
Figure 6B:
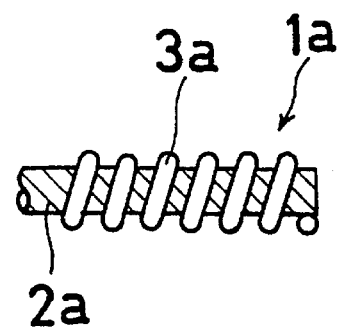

A method for manufacturing the sliding cable 1 will be described hereinafter. The core member 2 is shown in FIG. 5 as starting product 2a. The wire 3a is wound around the core member 2 in a first process so as to form the tooth member 3 on the core member 2. In consequence, the intermediate product 1a is manufactured as shown in the FIG. 6.

In a second process the foaming material 4a flows into the cavity 8a through the passage 8b at the moment the intermediate product 1a is pushed into the cavity 8a through the guide opening 9a. The foaming material 4a is applied to the core member 2 along the tooth member 3 in the cavity 8a.

In a third process, because the intermediate product 1a with the foaming material 4a applied to the intermediate product 1a is pushed out from the cavity 8a, the foaming material 4a is expanded and coagulated as a foam so as to project out from the outer circumferential surface of the tooth member 3. As a result, the covering member 4 is formed with the foaming material 4a, and the sliding cable 1 is completely manufactured as shown in the FIG. 7.

The detailed second process and the third process will be described hereinafter. When the heated liquid foaming material 4a flowing through the passage 8b is applied to the core member 2 in the cavity 8a, the base material of the foaming material 4a generates gas in a chemical reaction. At this time, because the foaming material 4a is walled in the cavity 8a and the passage 8b, the foaming material 4a is restrained from foaming. When the intermediate product 1a with the foaming material 4a applied to the core member 2 is pushed out from the cavity 8a, the base material of the foaming material 4a coagulates and the foaming material 4a is not restrained from foaming. Therefore the foaming material 4a is expanded by the generated gas. The foaming material 4a is solidified by coagulation of the base material of the foaming material 4a.

As described above, the covering member 4 can be formed in a process in which the extrusion molding machine 7 applies the foaming material 4a to the core member 2. That is to say, the foaming material 4a is applied to the core member 2 at the same time that the chemical reaction of the foaming material 4a proceeds. Therefore the sliding cable 1 is convenient to manufacture.

Figure 7A:
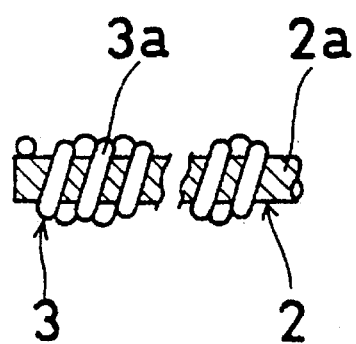
FIG. 7 is a plan view of a sliding cable of the present invention which is subjected to a third process of manufacturing the sliding cable.
Figure 7B:
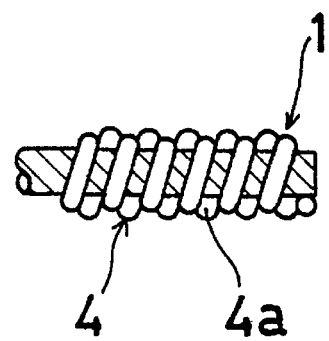
Figure 8:
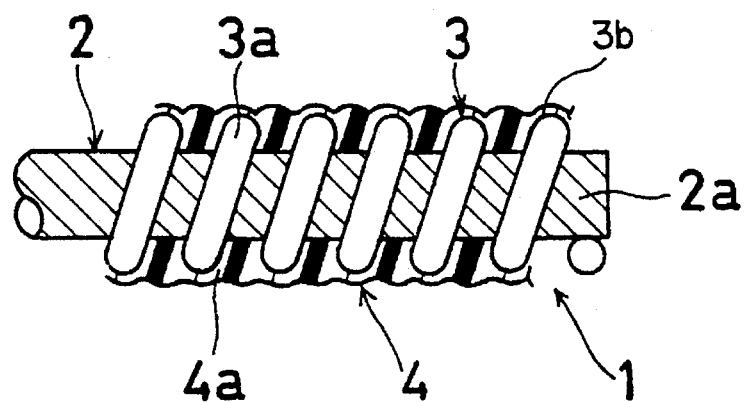
FIG. 8 is a sectional view of a sliding cable of a second embodiment of the present invention.

The covering member 4 is disposed only between windings of the tooth member 3 as shown in the FIG. 7. However, the covering member 4 may be disposed to cover the complete outer circumference 3b of the tooth member 3 as well as between the windings of the tooth member 3 as shown in the second embodiment of FIG. 8. In the second embodiment there is a clearance between the intermediate product 1 as in the cavity 8a and the walls of the cavity. When the sliding cable 1 shown in the FIG. 8 is manufactured, the foaming material 4a is applied to the intermediate product 1a through the clearance between the intermediate product 1a and the cavity 8a in the extrusion die 8. The sliding cable 1 shown in the FIG. 8 can more certainly prevent noise from being generated by the contact of the sliding cable 1 with the guide member 5.

In accordance with the invention, because the covering member 4 is not disposed between the core member 2 and the tooth member 3, the tooth member 3 can be prevented from being slid relative to the core member 2. Therefore the sliding power is efficiently transmitted from the gear member 6 to the sliding cable 1. Further because the covering member 4 projects out from the outer circumferential surface of the tooth member 3, noise is prevented from being generated by the contact of the sliding cable 1 with the guide member 5. Furthermore, the covering member 4 is formed on the core member 2 only by an extrusion molding process. Therefore the sliding cable 1 is convenient to manufacture.

While the invention has been particularly shown and described with reference to preferred embodiment thereof, it will be understood by those skilled in the art that the foregoing and other changes in form and details can be made therein without departing from the spirit and scope of the invention.

What is claimed as new and desired to be secured by Letters Patent of the U.S. is:

1. A sliding cable in combination with a gear and a guide member, the sliding cable being adapted to be positioned between the gear and the guide member so that the sliding cable is in meshing engagement with the gear and a movement of the sliding cable is guided by the guide member, the sliding cable comprising:

a core member;

a tooth member wound around the core member; and a foam covering member which is formed by extrusion molding of a foaming material and which covers the core member so as to project out from the tooth member, the foam covering member completely filling a space between adjacent windings of the tooth member and completely covering an outer circumference of the tooth member, the tooth member being in meshing engagement with the gear member via the foam covering member, and the foam covering member being in sliding contact with the guide member.

* * * * *